Feb. 24, 1931.   G. A. GEFFROY   1,794,011
ROTARY HARROW
Filed Jan. 16. 1930
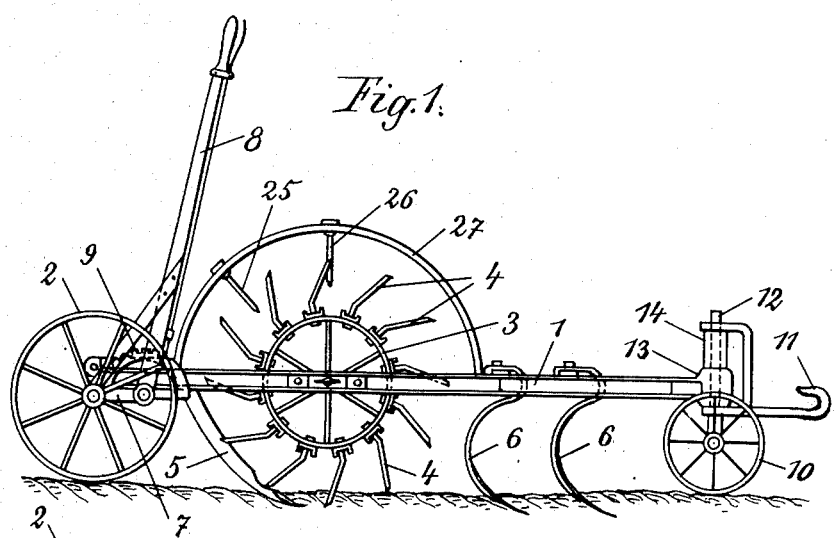
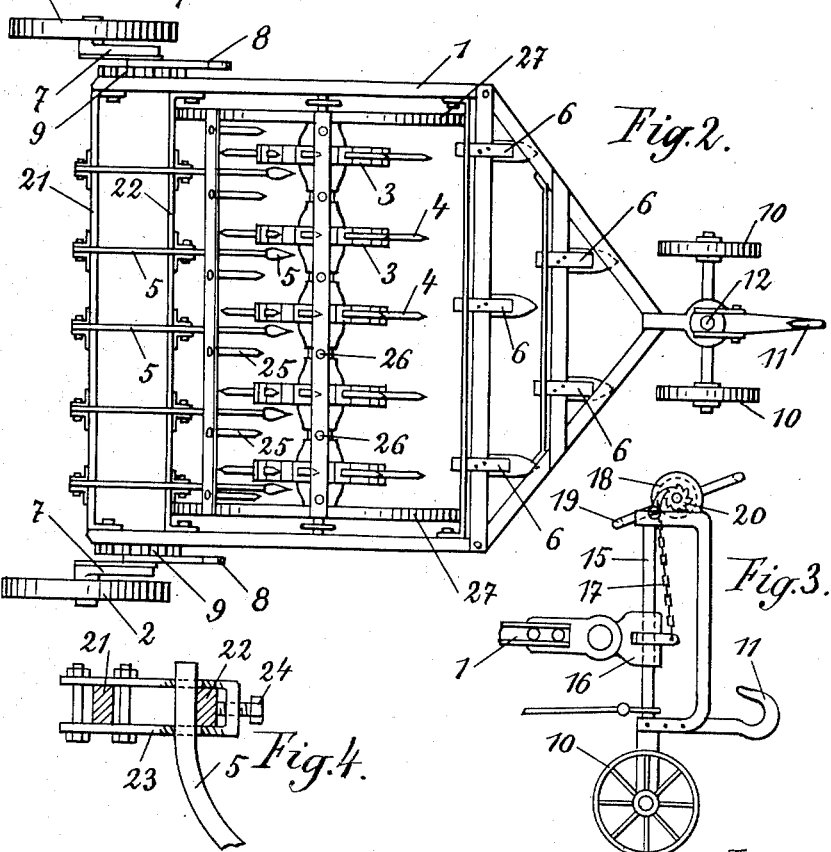
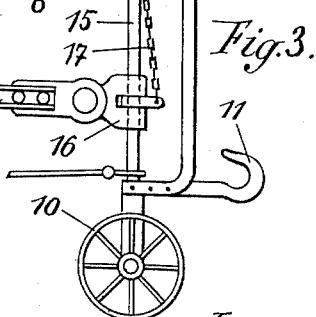
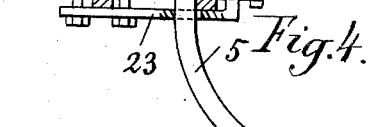
Inventor.
George August Geffroy Patented Feb. 24, 1931

1,794,011

UNITED STATES PATENT OFFICE

GEORGES AUGUSTE GEFFROY, OF FAVEROLLES, FRANCE

ROTARY HARROW

Application filed January 16, 1930, Serial No. 421,246, and in France January 18, 1929.

This invention relates to an agricultural machine adapted to serve both as an extirpator and as a harrow, that is to say adapted to be used both for mellowing the land and to rake up to the surface the vegetables and weeds buried by the plough on a first tilling.

In order to make my invention more clearly understood I have illustrated, as an example, an embodiment thereof in and by a drawing appended hereto and wherein:

Fig. 1 is a side view; and

Fig. 2 is a plane view of a rotary extirpator-harrow constructed in accordance with my invention;

Fig. 3 shows a modification of the fore-body thereof;

Fig. 4 illustrates a modification of the method of securing the extirpator-hooks.

My combined rotary extirpator and harrow is composed of a frame 1 mounted on wheels and provided with a suitable lifting device. Said frame carries a number of wheels 3 positioned side by side on one and the same spindle and whereon bent teeth 4 are secured.

Moreover, in rear and on one side of each wheel there is arranged a fixed extirpator hook 5 adapted slightly to dig into the ground near the place whence the rotary bent teeth leave the ground.

In front of each wheel but on the side thereof opposite the extirpator hook, there is arranged a hook 6 which may be made, as desired, either slightly resilient or quite rigid like hooks 5.

The frame is supported at its rear part by independent wheels 2 mounted on two bent axles 7 integral with two control levers 8 serving to adjust the depth to which the hooks dig into the ground, while a quadrant 9 is adapted to lock said levers in the position required.

The front part of the frame is supported on a fore-body composed of two wheels 10, of a tug hook 11 and of a vertical rod 12, the latter engaging into a lunette or eye-plate 13 integral with the frame. The clearance of this portion of the frame from the ground is adjustable by means of a removable socket 14 adapted to be positioned either above or under lunette 13.

In the embodiment shown by Fig. 3, the fore-body is composed of the two wheels 10, and of a vertical rod or spindle 15 along which is adapted to move a socket 16 integral with the frame. Said socket is equipped with a chain 17 running on a roller 18, a crank 19 serving to move the socket up and down the rod while a wheel and pawl 20 serves to lock it in the position required.

The rear part of the frame is made up of two cross-members 21 and 22 on which fit chapes 23 that offer two openings to let the hooks through, a bolt 24 serving to tighten the hook against cross member 22 and, consequently, to secure it firmly.

Two combs 25, 26, fixed on two arches 27, serve to clean off the bent teeth 4 the matters dragged by the latter in the course of operation.

As will be apparent, the extirpator hooks 6 dig the ground in front of the wheels 3, thereby facilitating the operation of the teeth 4, while the extirpator hooks 5 bring up the ground and the vegetable waste in the vicinity of teeth 4, thus fostering the tearing up of said waste by the teeth 4 as well as the dragging thereof above ground. The waste is arrested by combs 25, 26 so as to be dropped on to the ground without forming any heaps as the machine progresses.

Details of my rotary extirpator-harrow may be modified without departing from the scope of my invention, for instance the number of the wheels 3, of the teeth 4, of the hooks 5 and 6 may be varied according to the kind of work to be performed.

I claim:

1. A rotary extirpator-harrow characterized by the fact that there are arranged in a frame a number of wheels provided with bent teeth, said wheels being positioned on one and the same spindle but independent from one another, and fixed hooks being arranged laterally in front and in rear of each wheel so as to dig into the ground and to facilitate the operation of the moving teeth.

2. In a rotary extirpator-harrow as per claim 1, a fore-body fitted with a socket integral with the frame and adapted to be moved up and down a rod by means of a chain running on a roller adapted to be rotated by a crank, a wheel and pawl locking the said roller in the position required.

GEORGES AUGUSTE GEFFROY.